(12) United States Patent
Heuel et al.

(10) Patent No.: US 7,748,770 B2
(45) Date of Patent: Jul. 6, 2010

(54) SLIDING DOOR FOR A MOTOR VEHICLE

(75) Inventors: Gerhard Heuel, Olpe (DE); Ralf Rottmann, Drolshagen (DE)

(73) Assignee: Dura Automotive Body & Glass Systems GmbH, Plettenberg (DE)

( * ) Notice: Subject to any disclaimer, the term of this patent is extended or adjusted under 35 U.S.C. 154(b) by 790 days.

(21) Appl. No.: 11/431,296

(22) Filed: May 9, 2006

(65) Prior Publication Data

US 2006/0249983 A1 Nov. 9, 2006

(30) Foreign Application Priority Data

May 9, 2005 (DE) ........................ 10 2005 021 307
Jul. 22, 2005 (DE) ........................ 10 2005 034 346

(51) Int. Cl.
*B60J 5/06* (2006.01)
(52) U.S. Cl. ..................................................... 296/155
(58) Field of Classification Search ................. 296/155, 296/146.1, 147, 146.4, 146.9, 146.11
See application file for complete search history.

(56) References Cited

U.S. PATENT DOCUMENTS

| | | | |
|---|---|---|---|
| 3,935,674 A * | 2/1976 | Williams et al. | 49/212 |
| 4,000,582 A * | 1/1977 | Monot | 49/218 |
| 5,921,613 A * | 7/1999 | Breunig et al. | 296/155 |
| 6,036,257 A | 3/2000 | Manuel | |
| 6,183,039 B1 * | 2/2001 | Kohut et al. | 296/155 |
| 6,250,013 B1 * | 6/2001 | Apprich | 49/362 |
| 2003/0218358 A1 * | 11/2003 | Hahn | 296/155 |
| 2004/0108749 A1 * | 6/2004 | Pommeret et al. | 296/155 |

FOREIGN PATENT DOCUMENTS

| | | |
|---|---|---|
| DE | 6603297 U | 8/1969 |
| DE | 4131356 C1 | 2/1993 |
| DE | 29915279 U1 | 2/2001 |
| DE | 10116580 B4 | 10/2002 |
| DE | 10326241 A1 | 1/2005 |

* cited by examiner

*Primary Examiner*—H Gutman
(74) *Attorney, Agent, or Firm*—Alleman Hall McCoy Russell & Tuttle LLP (57) ABSTRACT

A sliding door for a vehicle is provided, the door particularly for a motor vehicle. In some examples, the sliding door comprises an inside, having a guide rail which is mounted in a sliding carriage so as to be longitudinally movable. In further examples, there is a hinge pin on the vehicle, the hinge pin for a hinge coulisse which is provided at the sliding door.

22 Claims, 12 Drawing Sheets

SLIDING DOOR FOR A MOTOR VEHICLE

CROSS-REFERENCE TO RELATED APPLICATION

This application claims priority to German Patent Application Serial No. 10 2005 021 307.3, filed May 9, 2005, and also claims priority to German Patent Application Serial No. 10 2005 034 346.5, filed Jul. 22, 2005, both of which are hereby incorporated by reference in their entirety for all purposes.

FIELD

The present disclosure relates to a sliding door for a vehicle, in particular for a motor vehicle.

BACKGROUND AND SUMMARY

Sliding doors for motor vehicles are known already. In the known solutions, the vehicle body has a guide rail on its outside, in which the sliding door is guided so as to be longitudinally movable. These guide rails are susceptible to damages and soiling. They are also disadvantageous from the point of view of design.

It is the object of the present disclosure to propose an improved sliding door for a vehicle.

In accordance with the present disclosure, this object is solved by example sliding doors provided herein. On its inside, the sliding door has a guide rail, which is mounted in a sliding carriage so as to be longitudinally movable. Thus, a guide rail in the vehicle body is not necessary.

Advantageously, a motor is provided for driving the guide rail. This can be an electric motor and/or a gear motor.

The motor preferably is provided on the sliding carriage. By means of the motor, the guide rail can be driven relative to the sliding carriage.

Preferably, a gear wheel can be driven by the motor. The gear wheel preferably engages in a rack provided on the sliding door. In accordance with another advantageous embodiment, the gear wheel engages in a further gear wheel, which engages in a further rack. The further gear wheel preferably has the same diameter and the same number of teeth as the gear wheel that can be driven by the motor. The further rack preferably is spaced from and parallel to the first rack.

Another advantageous embodiment is characterized in that the sliding carriage is pivotally mounted.

Preferably, the sliding carriage is mounted on a hinge bracket. Advantageously, the sliding carriage is pivotally mounted on the hinge bracket.

The hinge bracket preferably is pivotally mounted on the vehicle.

Advantageously, a motor is provided for driving the hinge bracket. The motor preferably is provided on the vehicle or motor vehicle. It can be an electric motor and/or a gear motor. The hinge bracket can be swivelled by the motor.

Preferably, a gear wheel can be driven by the motor. The gear wheel preferably engages in a gear wheel provided on the swivel arm.

Another advantageous embodiment is characterized in that the sliding door is lockable at the end of the vehicle facing away from the hinge bracket. Preferably, the sliding door is lockable such that upon swivelling the hinge bracket a compensation of length and a rotatability are provided at the locking point.

Preferably, this can be achieved in that on the vehicle a hinge pin for a hinge coulisse is provided at the sliding door. The arrangement can also be effected the other way round: Then, the hinge pin is provided at the sliding door, and the hinge coulisse is provided at the vehicle. Preferably, this is an open hinge coulisse, into which the hinge pin can enter and from which the hinge pin can exit. U-shaped hinge coulisses are particularly useful. The hinge pin and the hinge coulisse preferably are arranged and adjusted to each other such that they guide the sliding door into the closed position.

At the hinge coulisse, a switch, in particular a microswitch, is preferably provided. The switch preferably is located in the vicinity of the end of the hinge coulisse, i.e. near the point at which the hinge pin exits or enters the hinge coulisse. The point at which a longitudinal movement of the sliding door should begin can be detected by the switch.

Another advantageous embodiment is characterized in that on the hinge bracket a reversing arm with a guide pin is provided, which is guided in a reversing guideway provided on the sliding door.

Preferably, a lock guideway branches off from the reversing guideway.

The branching point of the lock guideway branching off from the reversing guideway preferably can be closed by a lock pawl. Advantageously, the lock pawl is pivotally mounted. Preferably the lock pawl forms part of the lock guideway.

In the lock guideway, a locking nose can be provided for the guide pin.

The lock pawl preferably is spring-loaded. Advantageously, the lock pawl is lockable, preferably by means of a locking bolt.

The present disclosure furthermore relates to a vehicle, in particular a motor vehicle, which is characterized by a sliding door in accordance with the present disclosure.

BRIEF DESCRIPTION OF THE FIGURES

One embodiment of the present disclosure will subsequently be explained in detail with reference to the attached drawings, in which.

DETAILED DESCRIPTION

Figure 1:
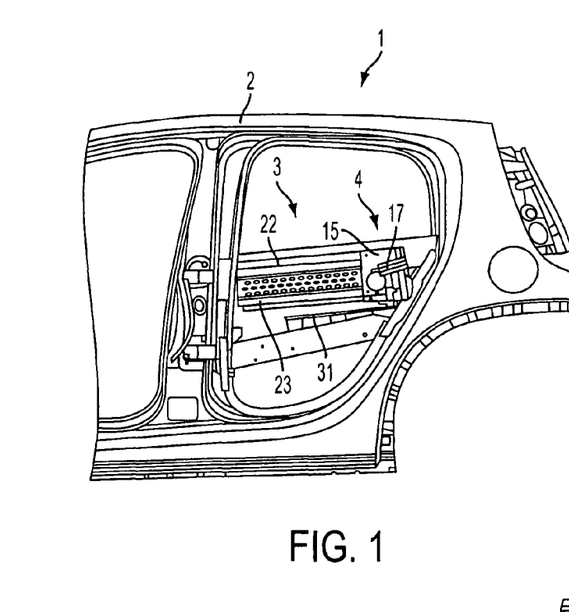
FIG. 1 shows part of a body of a motor vehicle with a partly open sliding door in a side view.
Figure 2:
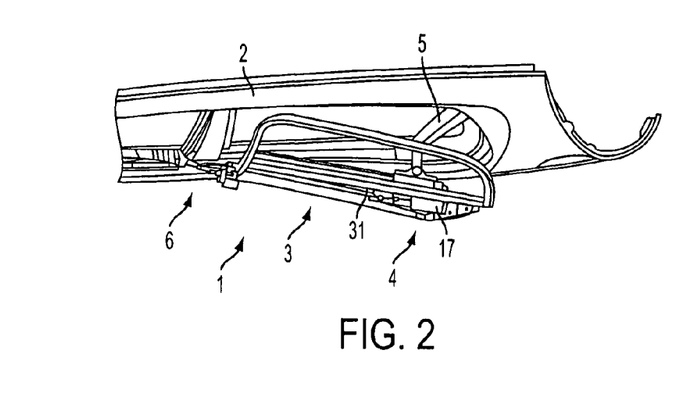
FIG. 2 shows the body of FIG. 1 in a top view.

In FIGS. 1 and 2 a sliding door 1 is shown, which is partly open with respect to the body 2 of a motor vehicle. On its inside, the sliding door 1 has a guide rail 3 which is mounted in a sliding carriage 4 so as to be longitudinally movable.

On the body 2, a hinge bracket 5 is pivotally mounted. At the other end of the hinge bracket 5, the sliding carriage 4 is pivotally mounted.

When opening the sliding door 1, the same is first swivelled from the closed position (not shown in the drawing) into the partly open position, which is shown in FIGS. 1 and 2. This is effected by swivelling the hinge bracket 5. To provide for this swivel movement, a U-shaped hinge coulisse 6 is provided at the end of the sliding door 1 opposite the hinge bracket 5, i.e. in the illustrated embodiment at the front end of the sliding door 1. The U-shaped hinge coulisse 6 substantially extends parallel to the longitudinal direction of the vehicle. It is open at its end facing away from the hinge bracket 5, i.e. in this embodiment at the front end. A hinge pin 7, which protrudes upwards substantially vertically, engages in the U-shaped hinge coulisse 6. By means of the hinge pin 7 and the hinge coulisse 6, the sliding door 1 can be locked at the vehicle at the end facing away from the hinge bracket 5.

When the sliding door 1 is completely closed, the hinge pin 7 lies inside the U-shaped hinge coulisse 6, namely at a distance from the end thereof. During the opening movement produced by swivelling the hinge bracket 5, the sliding door 1 performs a swivel movement about the hinge pin 7. In doing so, the U-shaped hinge coulisse 6 is sliding relative to the hinge pin 7 away from the same. In the position of the sliding door 1 as shown in FIGS. 1 and 2, in which the sliding door 1 is ajar, the hinge pin 7 is located at the open end of the U-shaped hinge coulisse 6.

During the closing movement, the sliding door 1 is positioned such that the open end of the U-shaped hinge coulisse 6 receives the hinge pin 7. This provides for the closing movement of the sliding door 1 up to the completely closed position.

Figure 4:
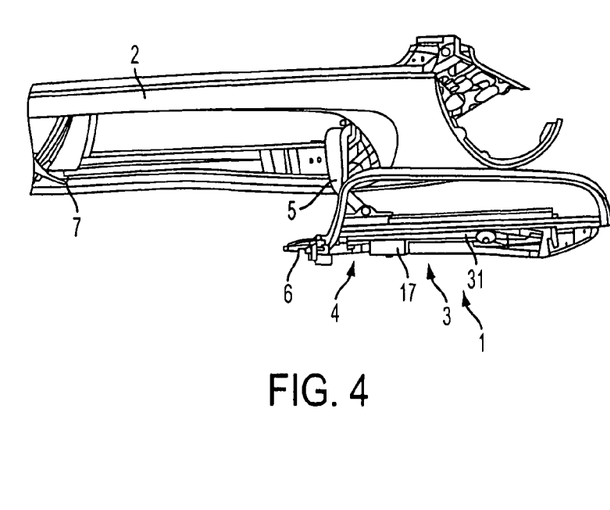
FIG. 4 shows the sliding door of FIG. 3 in a top view.
Figure 5:
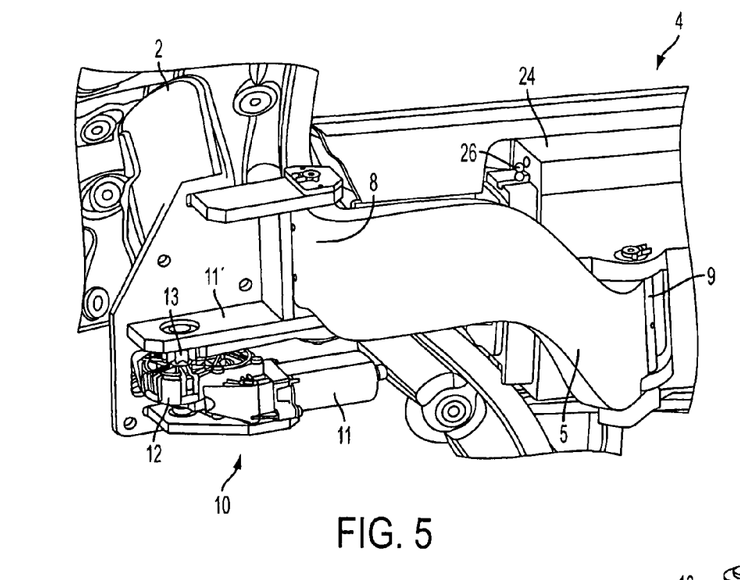
FIG. 5 shows the hinge bracket and the components associated thereto in a perspective view.
Figure 6:
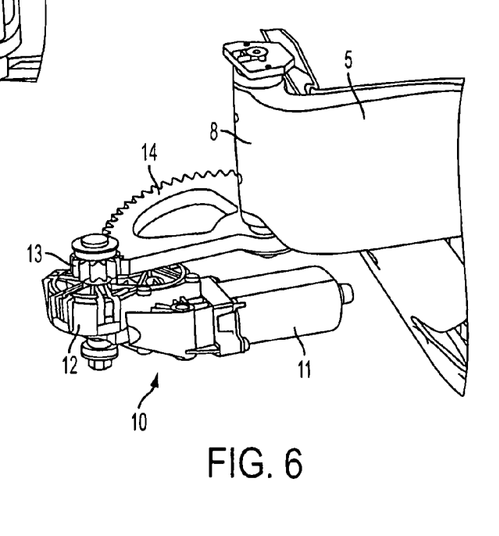
FIG. 6 shows the components of FIG. 5, but without a few body components.

In FIGS. 5 and 6, the hinge bracket 5 and the parts surrounding the same are shown on an enlarged scale. On a part of the body 2, the hinge bracket 5 is pivotally mounted about a substantially vertically extending axis 8. At its other end, it is pivotally mounted at the sliding carriage 4 about a likewise substantially vertically extending axis 9. The hinge bracket 5 comprises a central portion, which in a top view (FIGS. 2 and 4) extends substantially straight or flat, but which, as can in particular be taken from FIG. 5, extends downwards at an angle in the direction from the body 2 to the sliding carriage 4. In the top view (FIGS. 2 and 4), two end portions, at the ends of which the axes 8, 9 are disposed, are bent from the central portion of the hinge bracket 5, the end facing the axis 8 being bent at an angle of about 90° and the end facing the axis 9 being bent at an angle of about 45°, so that the end portions form an angle of about 135°.

For swivelling the hinge bracket 5 a gear motor 10 is used, which is attached to an angular sheet 11' at the C-pillar of the body 2. The gear motor 10 comprises an electric motor 11, which drives a transmission 12 whose vertically extending output shaft carries a gear wheel 13 which can be driven by the gear motor 10.

In FIG. 6, the angular sheet 11' has been omitted as compared to the representation in FIG. 5. As can be taken from FIG. 6, the gear wheel 13 engages in a gear wheel 14, which is provided on the swivel arm 5. The gear wheel 14 is pivotally mounted about the axis 8. It is non-rotatably connected with the swivel arm 5. As the swivel arm 5 must only perform a rotation through about 90°, the gear wheel 14 also only extends over an angle of substantially 90°.

Figure 7:
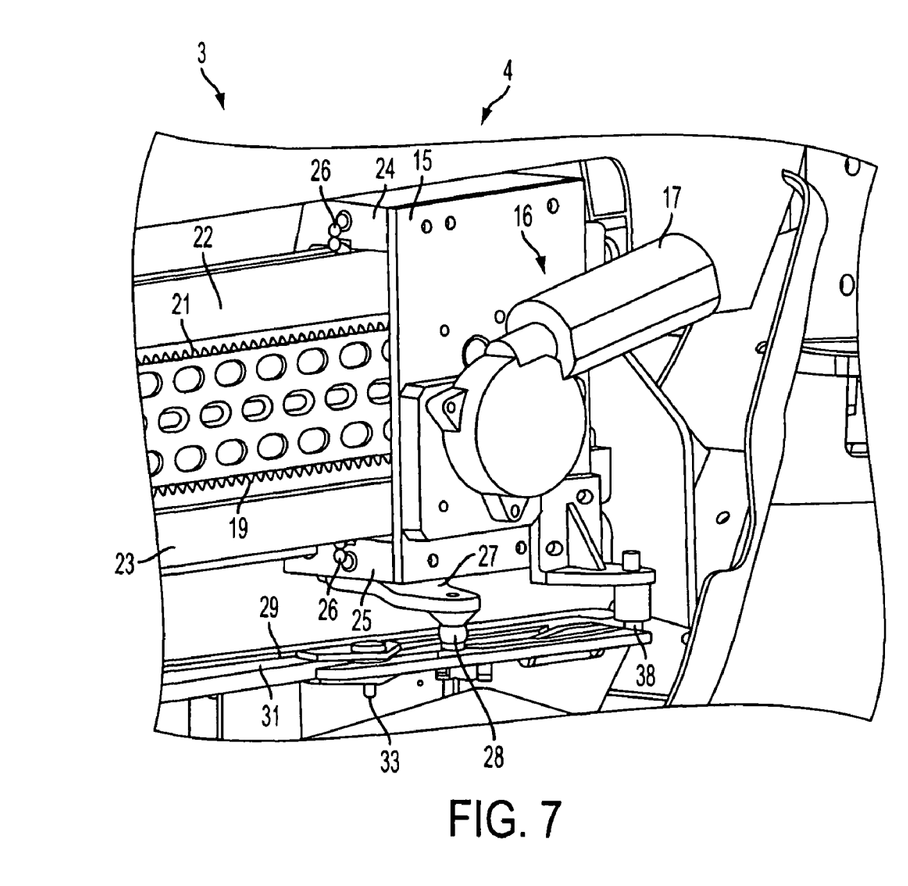
FIG. 7 shows the sliding carriage and the components associated thereto in a perspective view.

As can be taken from FIG. 7, a gear motor 16, which serves to drive the guide rail 3, is attached to a substantially vertically extending connecting plate 15 of the sliding carriage 4. The gear motor 16 comprises an electric motor 17, whose output shaft extending substantially horizontally and parallel to the guide rail 3 carries a worm gear which drives a gear wheel whose axis of rotation extends substantially horizontally and transverse to the guide rail 3.

Figure 8:
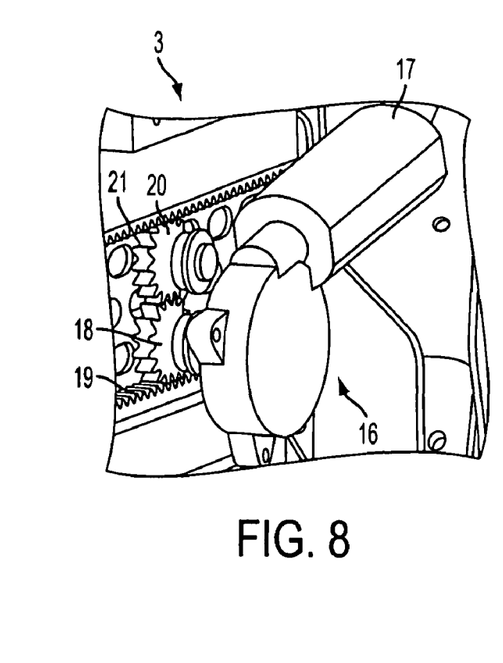
FIG. 8 shows the components of FIG. 7, but without a few parts of the sliding carriage.

This gear wheel is connected with a gear wheel 18, which can be seen in FIG. 8, as here the connecting plate 15 of the sliding carriage 4 was omitted. The gear wheel 18 engages in a rack 19 provided at the sliding door 1. The rack 19 extends parallel to the guide rail 3.

The gear wheel 18 driven by the gear motor 16 furthermore engages in a further gear wheel 20, which in turn engages in a further rack 21. The driven gear wheel 20 has the same diameter and the same number of teeth as the driving gear wheel 18. It is mounted on the sliding carriage 4 so as to be rotatable about an axis which is parallel to and spaced from the axis of the driving gear wheel 18. The further rack 21 extends parallel to and at a distance from the first rack 19. The rotary movement introduced by the gear motor 16 into the driving gear wheel 18 puts the driven gear wheel 20 into an oppositely directed rotary movement. Since they are supported on the racks 19, 21, the oppositely directed rotations of the gear wheels 18, 20 effect a linear movement of the guide rail 3 with respect to the sliding carriage 4.

As can be taken from FIG. 7, the guide rail 3 comprises an upper guide bead 22 and a lower guide bead 23, guide blocks 24, 25 of the sliding carriage 4 engaging over the outer ends thereof. The sliding guidance of the guide beads 22, 23 in the guide blocks 24, 25 is effected by an antifriction bearing 26.

Figure 3:
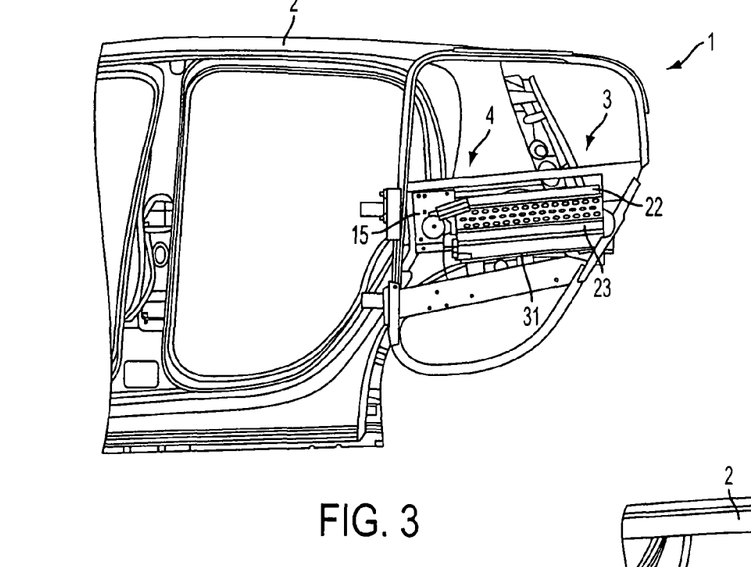
FIG. 3 shows the sliding door of FIGS. 1 and 2 in the open condition in a side view.

The present disclosure creates an electromechanical drive system for a sliding door of a vehicle, in particular a motor vehicle, which can comprise two drive units which each perform different functions. A first drive unit is implemented by the gear motor 10 and the components associated thereto. This drive unit performs the first opening movement of the sliding door 1, i.e. moving the sliding door 1 in the "ajar" position, as is shown for instance in FIGS. 1 and 2. A second drive unit is formed by the gear motor 16 and the components associated thereto. This drive unit performs the "linear movement" of the sliding door 1 up to the completely open position, which is shown in FIGS. 3 and 4, and back again. The first drive unit and the second drive unit can electromechanically be connected with each other such that this results in an opening movement and the opposite closing movement.

FIGS. 9 to 19 illustrate the sequence of movements when the sliding door 1 is opened and closed. At the hinge bracket 5 a reversing arm 27 is provided, which at its end has a guide pin 28. The reversing arm 27 forms an extension of the end portion of the hinge bracket 5 facing the axis 9.

The guide pin 28 has a universal ball joint, which is guided in a reversing guideway 29 and in a lock guideway 30. The reversing guideway 29 is provided in a guide sheet 31 which is connected with the sliding door 1. It substantially extends in a longitudinal direction of the vehicle.

The lock guideway 30 branches off from the reversing guideway 29. The branching point 32 is located at the rear end of the reversing guideway 29. The lock guideway 30 extends at an acute angle with respect to the reversing guideway 29.

Figure 9:
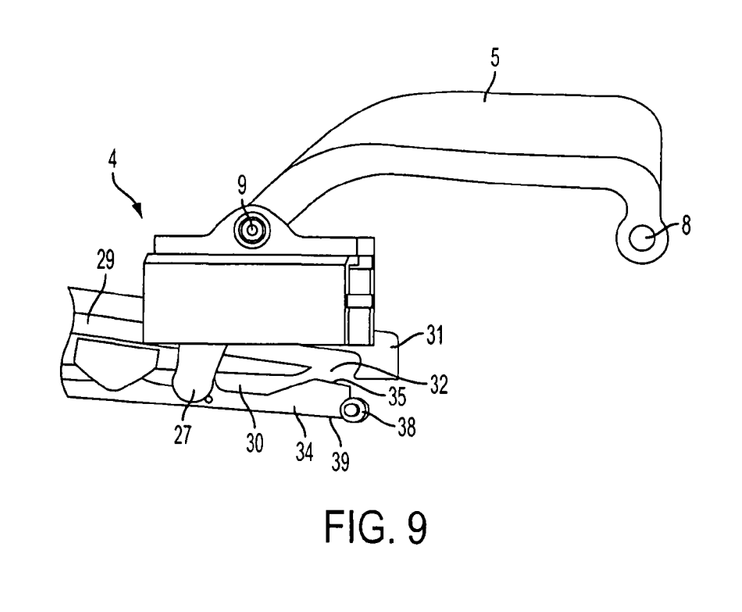
FIG. 9 shows the hinge arm and the reversing guideway in top view with the sliding door closed.
Figure 10:
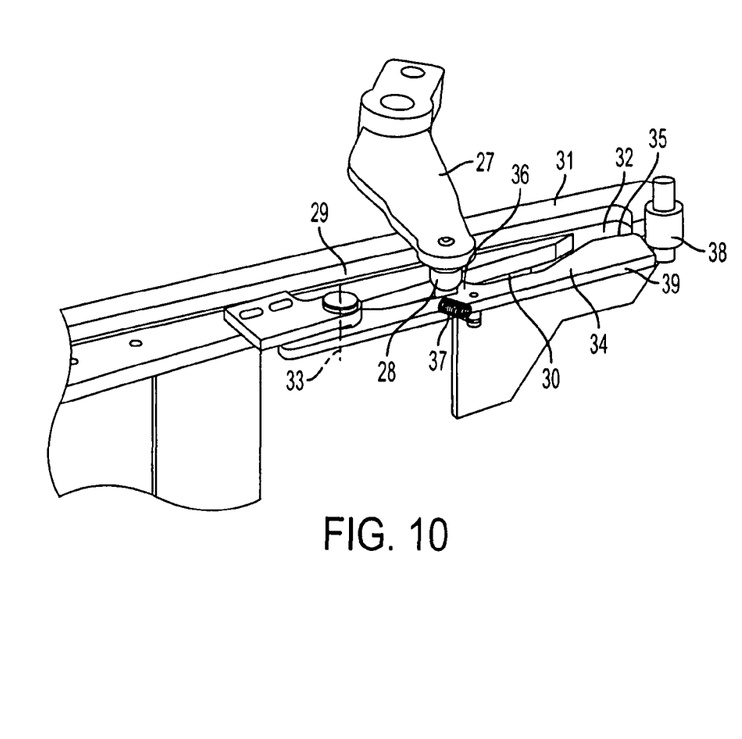
FIG. 10 shows a perspective representation corresponding to FIG. 9.

At the front end of the lock guideway 30, a vertical swivel axis 33 is provided, which can be formed by a bolt and about which a lock pawl 34 is pivotally mounted. By means of the lock pawl 34, the branching point 32 of the lock guideway 30 branching off from the reversing guideway 29 can be closed. At its end facing away from the swivel axis 33, the lock pawl 34 therefore has a closing portion 35 facing the branching point 32. When the lock pawl is in its inner terminal position, in which it is swivelled about the swivel axis 33 in anticlockwise direction, and which is shown in FIGS. 11 to 15, the branching point 32 is closed, so that the lock guideway 30 is not accessible for the guide pin 28. When the lock pawl 34 is in its outer terminal position, in which it is swivelled about the swivel axis 33 in clockwise direction, and which is shown in FIGS. 9 and 10, the branching point 32 is open, so that the lock guideway 30 is accessible for the guide pin 28.

The lock pawl 34 forms part of the lock guideway 30. As can be taken from FIGS. 9 to 15, the inside of the lock pawl 34 forms the outside of the lock guideway 30. The inside of the lock guideway 30 is formed by an outside of the guide sheet 31.

In the lock guideway 30, a locking nose 36 is provided for the guide pin 28. The locking nose 36 is located approximately in the middle of the lock guideway 30. It is provided on the lock pawl 34. Its flank facing the swivel axis 33 forms an angle of substantially 90° with the lock guideway 30. Its flank facing away from the swivel axis 33 forms an angle of about 45° with the lock guideway 30.

The lock pawl 34 is biased by a return spring 37, which constitutes a tension spring and is attached on the one hand to the guide sheet 31 and on the other hand to the lock pawl 34, namely below these components. The lock pawl 34 is biased by the return spring 37 in anticlockwise direction about the swivel axis 33, i.e. in that direction in which the lock pawl 34 closes the branching point 32.

Figure 11:
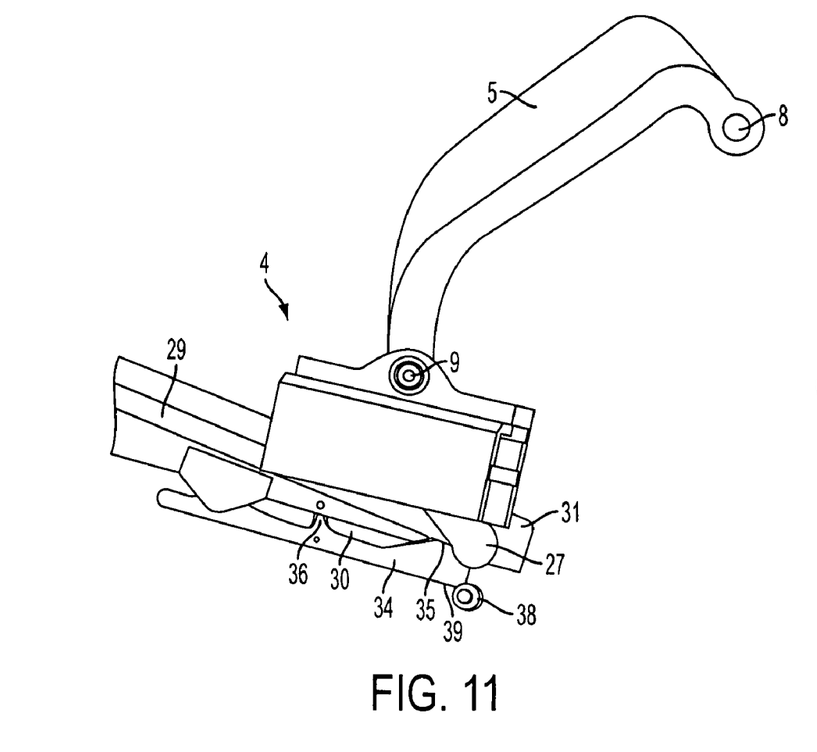
FIG. 11 shows the hinge arm and the reversing guideway in a top view with the sliding door ajar.
Figure 12:
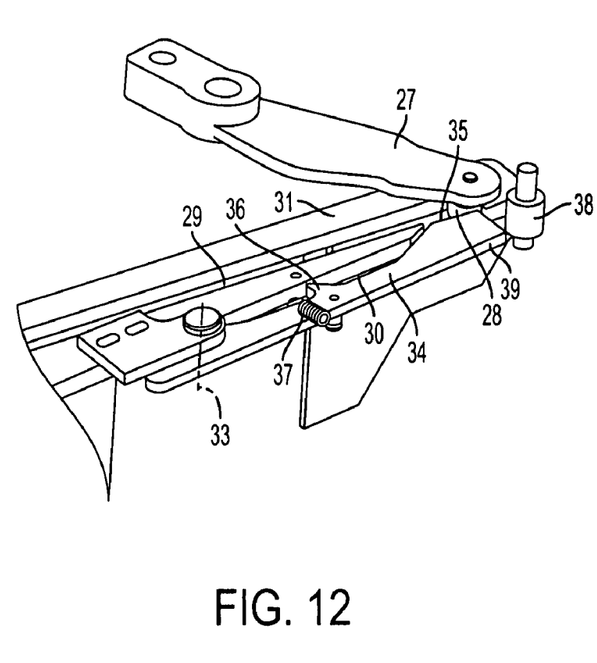
FIG. 12 shows the reversing arm and the reversing guideway in a perspective representation with the sliding door ajar.
Figures 13, 14:
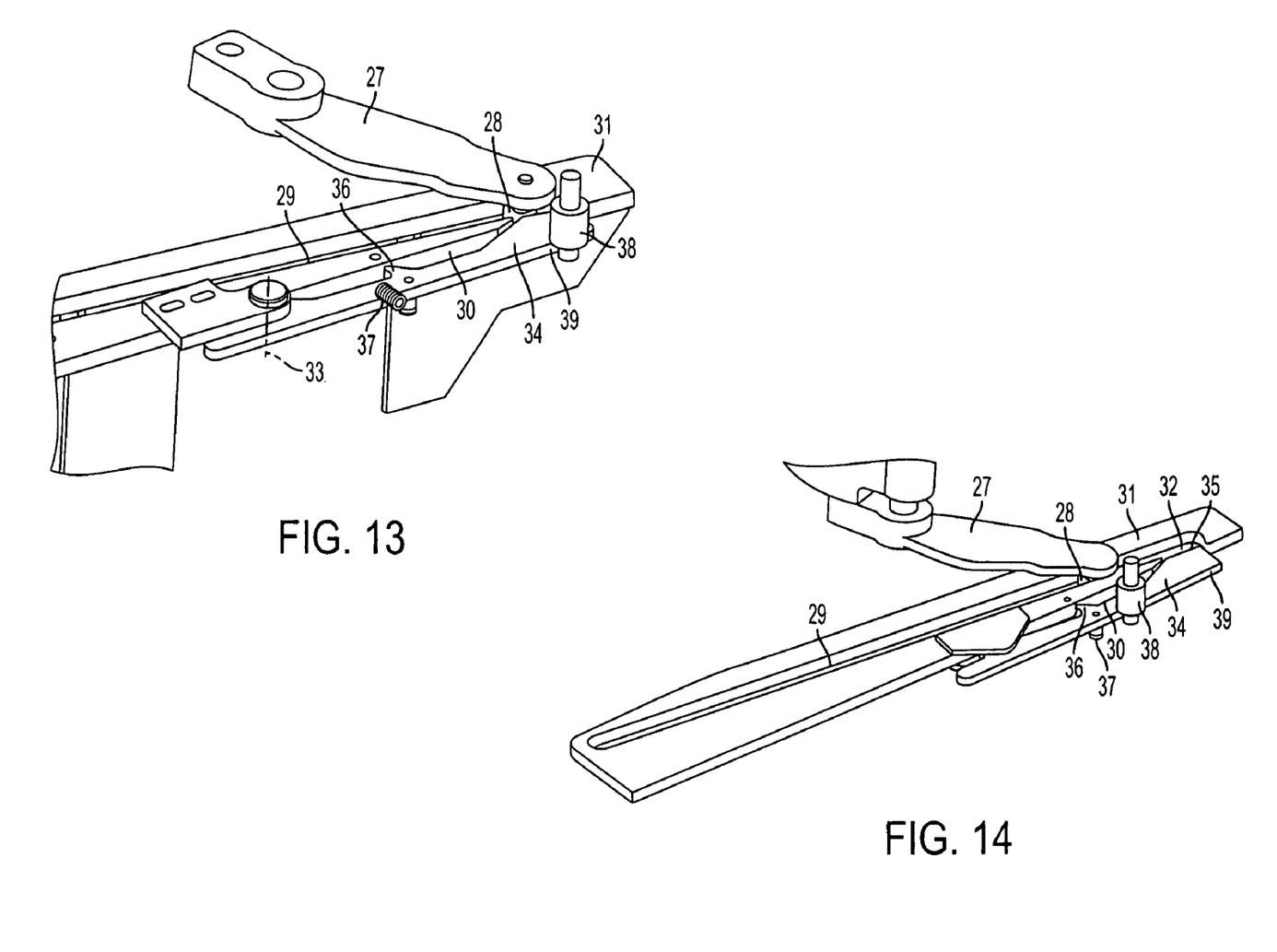
FIG. 13 shows a representation corresponding to FIG. 12 with an intermediate position of the sliding door.
FIG. 14 shows a representation corresponding to FIGS. 12 and 13 with more advanced intermediate position of the sliding door.

The lock pawl 34 is lockable. For this purpose, a locking bolt 38 is provided on the sliding carriage 4, which is located at the outer portion 39 of the lock pawl 34 opposite the closing portion 35, when the sliding door assumes an intermediate position, as shown in FIGS. 13 and 14. In this position, the locking bolt 38 prevents a swivel movement of the lock pawl 34 about the swivel axis 33 in clockwise direction, i.e. in a direction towards opening the branching point 32, so that the branching point 32 remains closed. When the sliding door 1 is closed or ajar, as shown in FIGS. 9 to 12, the locking bolt 38 is not disposed at the outer portion 39 of the lock pawl 34 opposite the closing portion 35, so that the lock pawl 34 can be swivelled about the swivel axis 33 in clockwise direction, and hence the branching point 32 can be opened.

When the sliding door 1 is closed, the reversing arm 27 assumes the position shown in FIG. 9, in which its guide pin 28 rests against the flank of the locking nose 36 facing the swivel axis 33. As this flank extends at an angle of about 90° with respect to the lock guideway 30, a self-locking effect is obtained, so that the sliding door 1 is locked in this position.

For opening the sliding door 1, the lock pawl 34 is swivelled about the swivel axis 33 in clockwise direction, until it assumes the position shown in FIG. 10. This swivel movement can be effected manually, for instance by actuating an opening lever or an opening handle. It can, however, also be effected by motor power, namely by a relay, an electric motor, a solenoid switch or some other actuator (not shown in the drawing). When the lock pawl 34 is in the position as shown in FIG. 10, the hinge bracket 5 can be swivelled. As a result, the guide pin 28 slides past the locking nose 36 further to the rear in the lock guideway 30. The locking bolt 38 still is not located on the portion 39 of the lock pawl 34 opposite the closing portion 35, so that the guide pin 28 can follow the further path to the rear in the lock guideway 30.

On this way, the guide pin 28 moves through the branching point 32. It reaches the rear end of the reversing guideway 29, as shown in FIGS. 11 and 12. Now, the hinge bracket 5 has been swivelled so far that the sliding door 1 is ajar, as shown in FIG. 2. In this position, the branching point 32 is closed, as the return spring 37 has swivelled the lock pawl 34 about the swivel axis 33 in anticlockwise direction.

Subsequently, the guide rail 3 is driven a short distance relative to the sliding carriage 4. As a result, the locking bolt 38 reaches the outer portion 39 of the lock pawl 34 opposite the lock portion 35, so that the lock pawl 34 is locked in its position closing the branching point 32, as shown in FIG. 13. The locking bolt is now guided in the reversing guideway 29.

Figure 15:
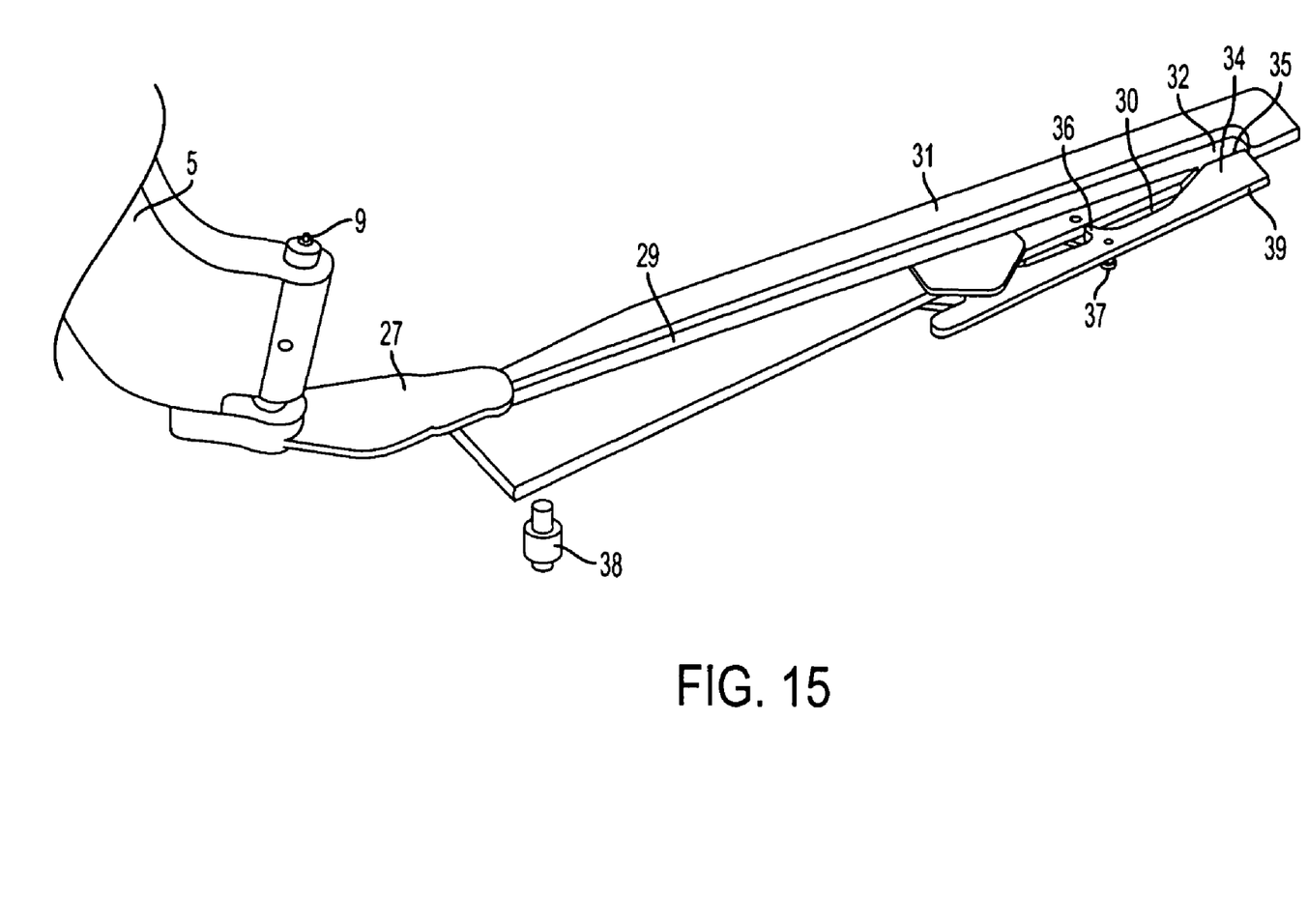
FIG. 15 shows a representation corresponding to FIGS. 12 to 14 with the sliding door open.

Subsequently, the hinge bracket 5 is swivelled further, whereby the front end of the sliding door 1 is swivelled away from the body 2. Thereafter, the guide rail 3 is driven, so that the sliding door 1 is moved to the rear. During these movements, the sliding door 1 is guided by the guide pin 28 sliding in the reversing guideway 29. The reversing guideway 29 is configured such that the sliding door 1 is moved to the rear substantially parallel to the body 2. For this purpose, the reversing guideway 29 can follow a substantially rectilinear path, as can in particular be taken from FIGS. 14 and 15. It can, however, also be curved or have curved portions. When the guide pin 28 has reached the front end of the reversing guideway 29, as shown in FIG. 15, the sliding door 1 is completely open.

When closing the sliding door 1, the reverse procedure is performed. The guide pin 28 moves in the reversing guideway 29 from the position shown in FIG. 15 through the intermediate position shown in FIG. 14 up to approximately the rear end of the reversing guideway 29, as shown in FIG. 13. Subsequently, the guide rail 3 is moved a short distance until the locking bolt 38 releases the portion 39 of the lock pawl 34 opposite the closing portion 35, as shown in FIG. 12. Thereafter, the hinge bracket 5 is swivelled. As a result, the lock guideway 30 is opened. This is effected by the guide pin 28 pressing onto the closing portion 35, so that the lock pawl 34 is swivelled about the swivel axis 33 in clockwise direction against the force of the return spring 37. As a result, the branching point 32 is opened, and the guide pin 28 enters the lock guideway 30.

Subsequently, the guide pin 28 comes to rest against the flank of the locking nose 36 facing away from the swivel axis 33, so that the lock pawl 34 is further pressed open, until the guide pin 28 has passed the locking nose 36. In this position, the lock pawl 34 is pulled tight again by the return spring 37, i.e. swivelled about the swivel axis 33 in anticlockwise direction, so that the locked position as shown in FIG. 9 is reached, in which the sliding door 1 is closed and locked.

FIGS. 16 to 19 show the hinge pin 7 provided at the body 2 and the hinge coulisse 6 provided at the sliding door 1 in an enlarged representation, each in a top view. The hinge coulisse 6 has a U-shaped configuration. It has a longer, substantially straight portion 40 and a shorter opening portion 41 angled therefrom towards the body 2. The outer leg 42 of the hinge coulisse 6 is longer than the inner leg 43. On the inside of the outer leg 42 in the vicinity of the opening portion 41 a microswitch 44 is disposed.

Figure 16:
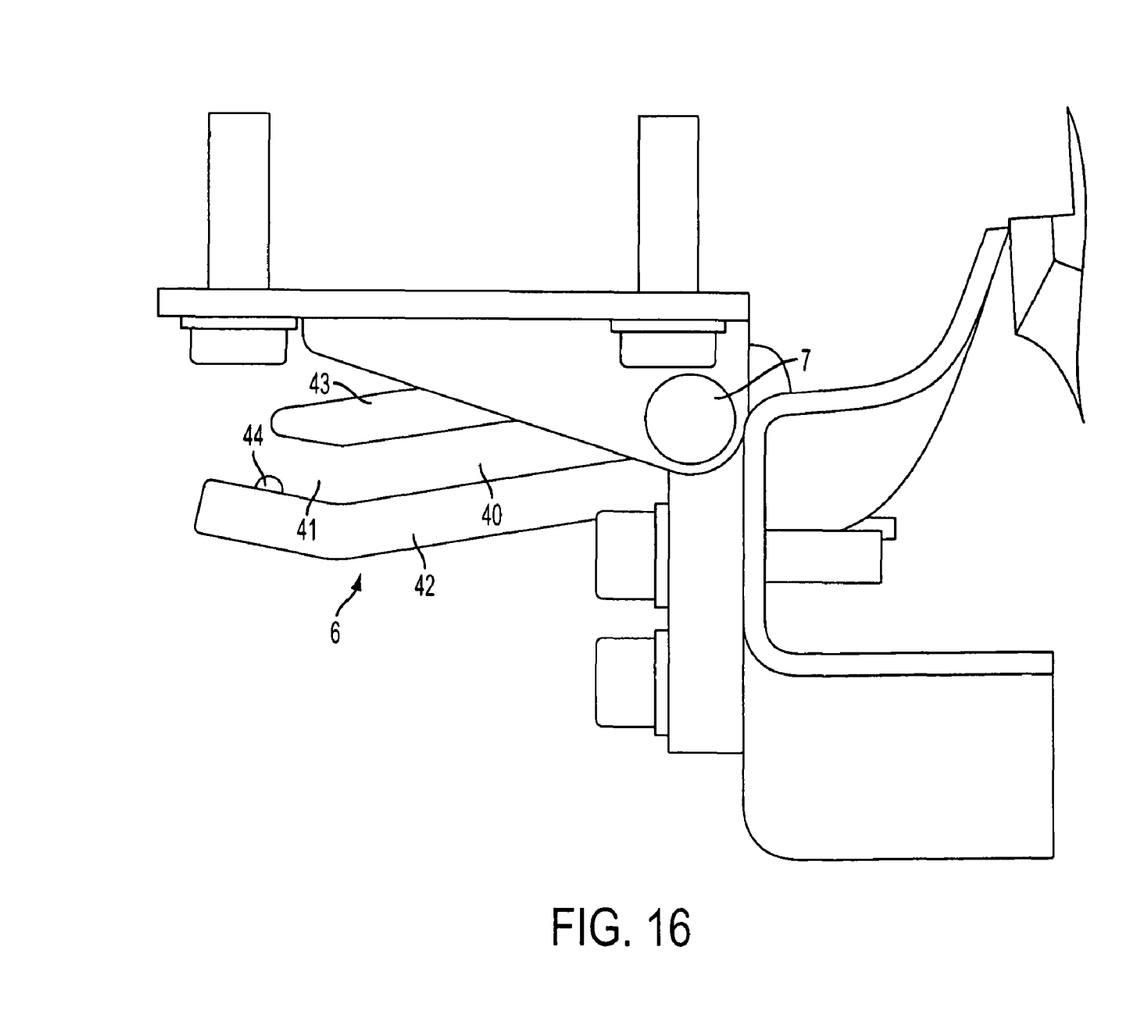
FIG. 16 shows the hinge pin and the hinge coulisse in a top view with the sliding door closed.
Figure 17:
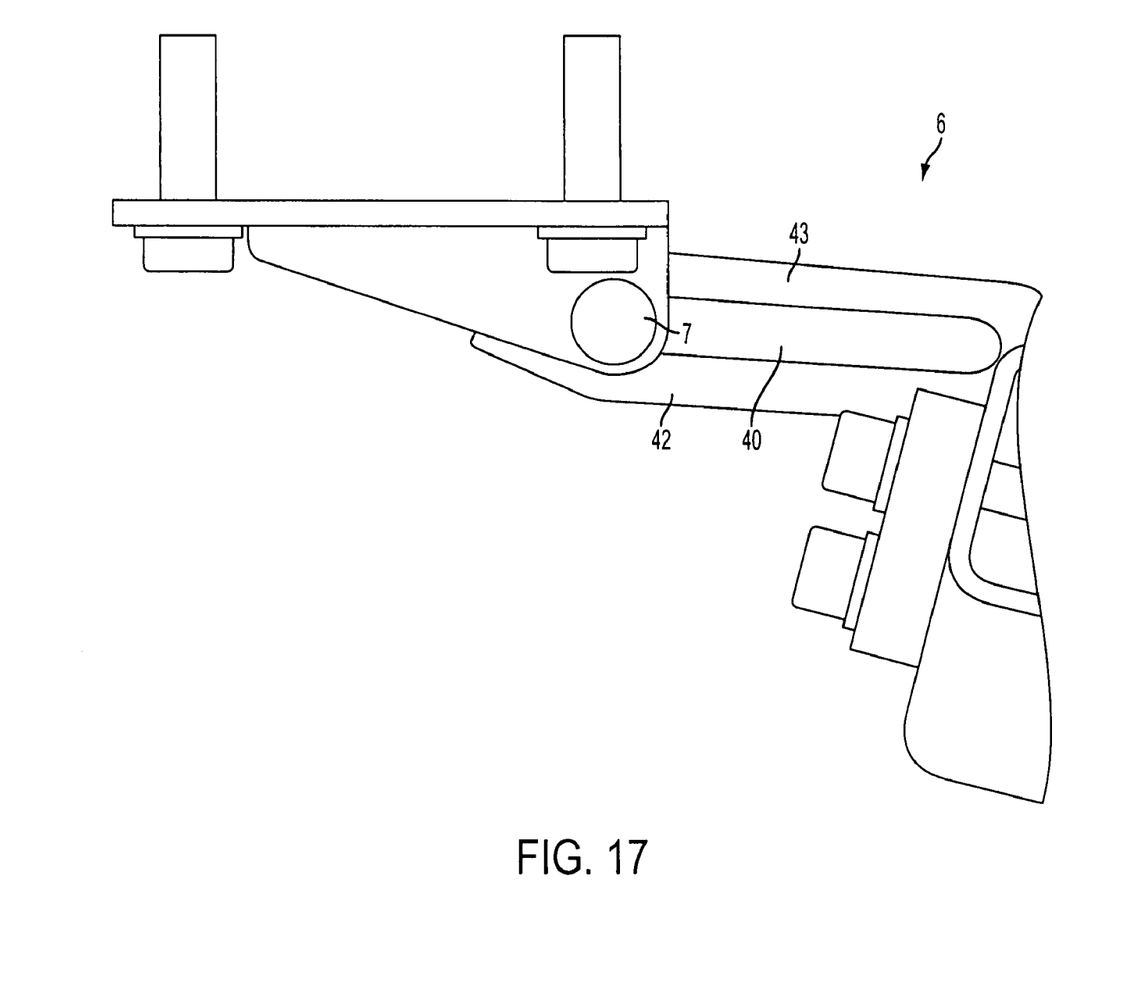
FIG. 17 shows a representation corresponding to FIG. 16 with the sliding door ajar.
Figure 18:
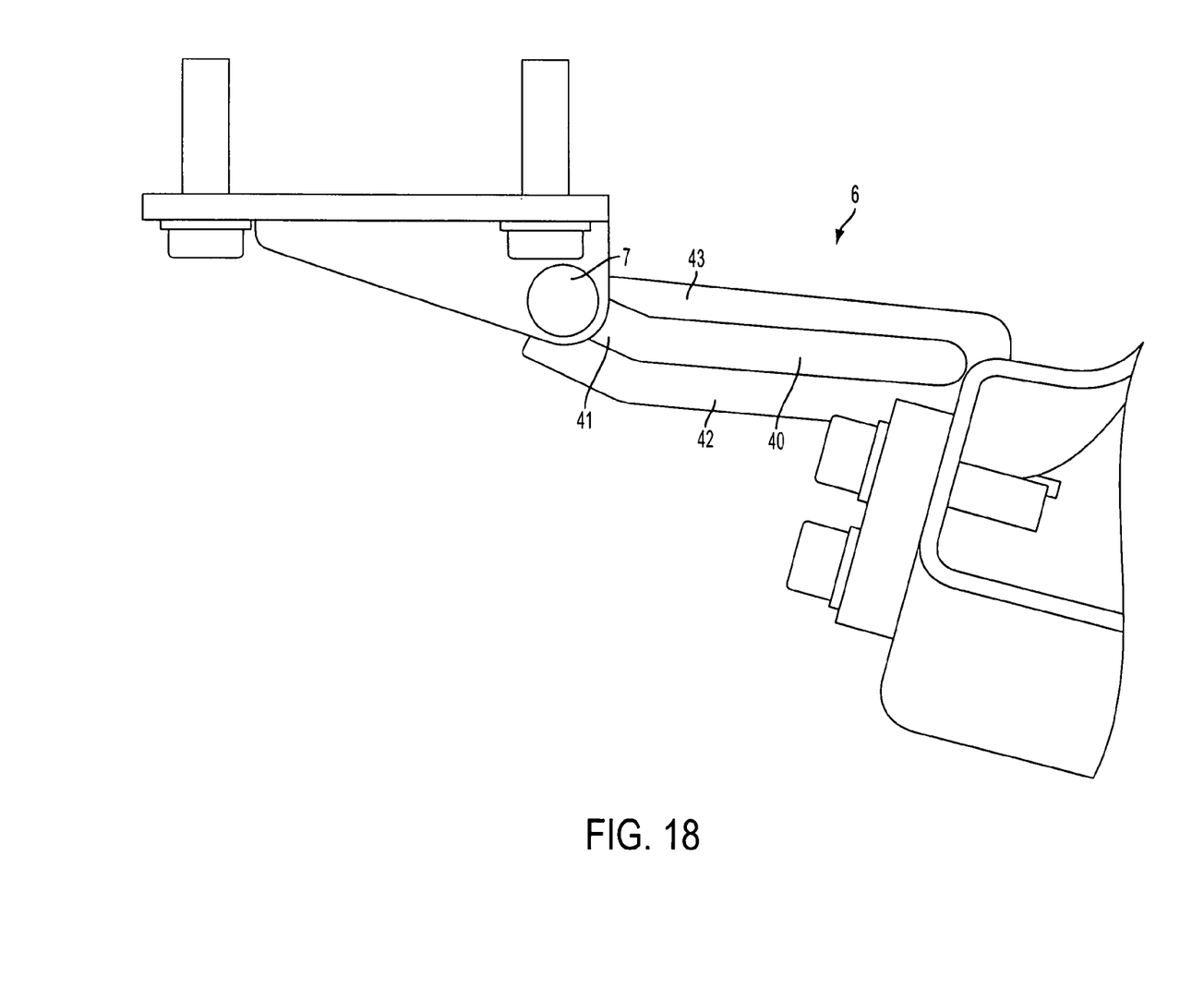
FIG. 18 shows a representation corresponding to FIGS. 16 and 17 with an intermediate position of the sliding door.

When the sliding door 1 is in the closed position, the hinge pin 7 is located in the vicinity of the inner end of the straight portion 40 of the hinge coulisse 6, as shown in FIG. 16. While the sliding door 1 is moved into the ajar position, which movement is produced by swivelling the hinge bracket 5, the hinge pin 7 moves within the straight portion 40 of the hinge coulisse 6 to the outside, until it has reached the outer end of the straight portion 40, i.e. the transition to the opening portion 41, as shown in FIG. 17. Thereafter, the hinge pin 7 passes through the opening portion 41 in the direction towards the outside, until the position shown in FIG. 18 is reached, in which the hinge pin 7 actuates the microswitch 44. This movement along the opening portion 41 is produced in that the guide rail 3 is driven and moved in dependence on the swivel movement of the hinge bracket 5.

Figure 19:
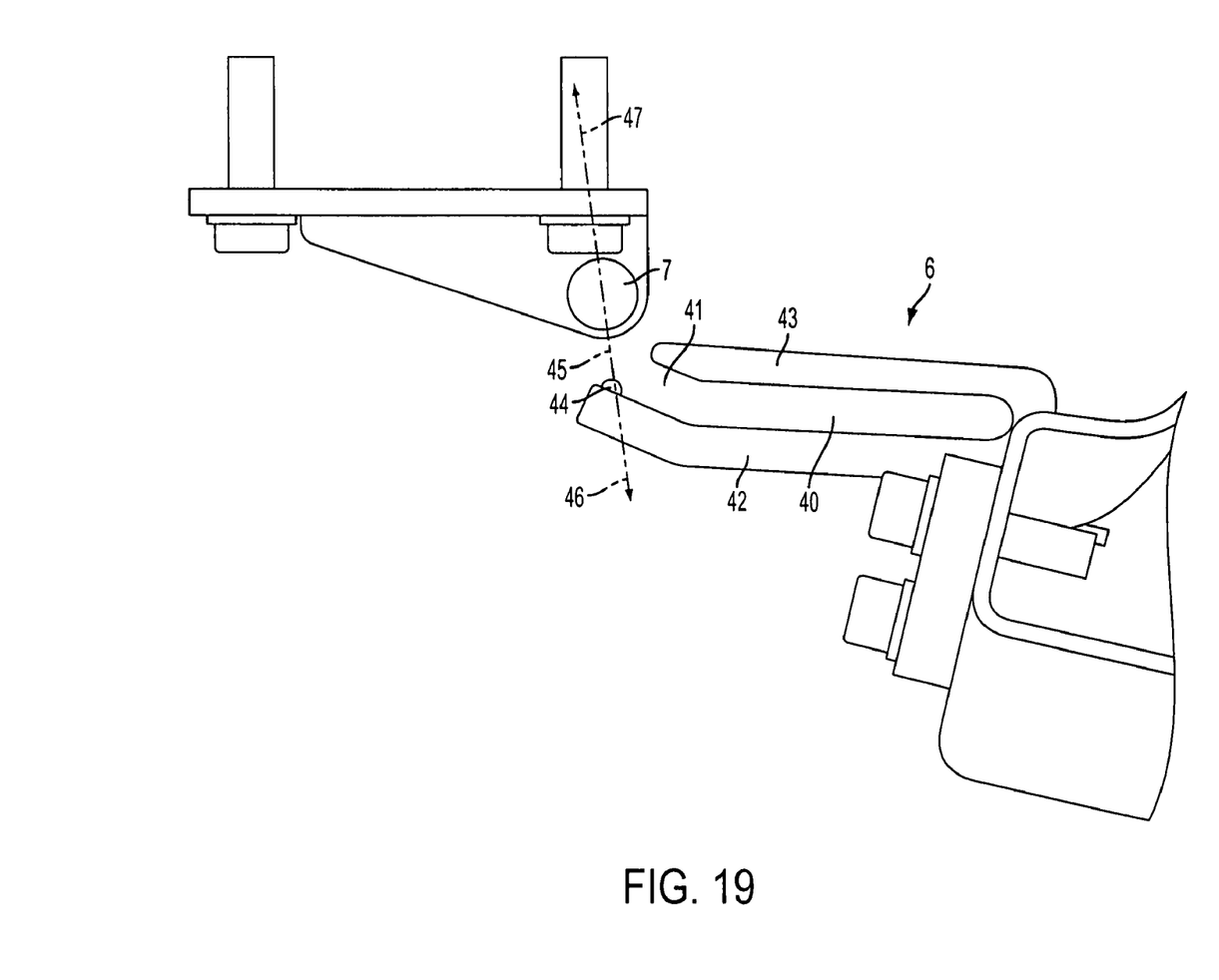
FIG. 19 shows a representation corresponding to FIGS. 16 to 18 with a more advanced intermediate position of the sliding door.

When closing the sliding door 1, the reverse procedure is performed. The hinge coulisse 6 moves on the circular path 45 around the axis 8 in the direction of the arrow 47 towards the hinge pin 7, as shown in FIG. 19, until the hinge pin 7 actuates the microswitch 44, as shown in FIG. 18. As a result, the swivel movement of the hinge bracket 5 is terminated and the longitudinal movement of the guide rail 3 is started. The hinge pin 7 passes through the opening portion 41 of the hinge coulisse 6 to the inside, until the position shown in FIG. 17 is reached. In this position, the longitudinal movement of the guide rail 3 is terminated. The hinge bracket 5 is swivelled, so that the hinge pin 7 passes through the straight portion 40 of the hinge coulisse 6 to the inside, until the position shown in FIG. 16 is reached, in which the sliding door 1 is closed.

The invention claimed is:

1. A sliding door for a vehicle, wherein the sliding door comprises:
    an inside having a guide rail which is mounted in a sliding carriage so as to be longitudinally movable, the sliding carriage mounted on a hinge bracket; and
    a hinge coulisse which is provided on the sliding door, wherein a hinge pin engages with the hinge coulisse, the hinge pin directly on a body pillar of the vehicle.

2. The sliding door as claimed in claim 1, further comprising a motor for driving the guide rail.

3. The sliding door as claimed in claim 2, further comprising a gear wheel that can be driven by the motor.

4. The sliding door as claimed in claim 3, wherein the gear wheel engages in a rack provided on the sliding door.

5. The sliding door as claimed in claim 4, wherein the gear wheel engages in a further gear wheel, which engages in a further rack.

6. The sliding door as claimed in claim 1, wherein the sliding carriage is pivotally mounted;
    wherein the hinge pin is received into the hinge coulisse when the sliding door is in a closed position; and
    wherein the hinge pin and hinge coulisse are separated when the sliding door is in an open position.

7. The sliding door as claimed in claim 1, wherein the hinge bracket is pivotally mounted on the vehicle.

8. The sliding door as claimed in claim 1, comprising a motor for driving the hinge bracket.

9. The sliding door as claimed in claim 8, comprising a gear wheel that can be driven by the motor.

10. The sliding door as claimed in claim 9, wherein the gear wheel engages in a gear wheel provided on the hinge bracket.

11. The sliding door as claimed in claim 1, wherein the sliding door is lockable at an end of the vehicle facing away from the hinge bracket.

12. The sliding door as claimed in claim 1, further comprising a switch that is provided at the hinge coulisse.

13. The sliding door as claimed in claim 1, comprising at the hinge bracket a reversing arm with a guide pin, which is guided in a reversing guideway provided on the sliding door.

14. The sliding door as claimed in claim 13, further comprising a lock guideway that branches off from the reversing guideway.

15. A vehicle comprising the sliding door of claim 1.

16. The vehicle as claimed in claim 15, wherein the vehicle comprises a motor vehicle.

17. A sliding door for a vehicle, wherein the sliding door comprises:
    an inside having a guide rail which is mounted in a sliding carriage so as to be longitudinally movable, the sliding carriage mounted on a hinge bracket;
    at the hinge bracket a reversing arm with a guide pin, which is guided in a reversing guideway provided on the sliding door; and
    a lock guideway that branches off from the reversing guideway, wherein the branching point of the lock guideway branching off from the reversing guideway can be closed by a lock pawl.

18. The sliding door as claimed in claim 17, wherein the lock pawl is pivotally mounted.

19. The sliding door as claimed in claim 17, wherein the lock pawl forms part of the lock guideway.

20. The sliding door as claimed in claim 17, further comprising a locking nose for the guide pin in the lock guideway.

21. The sliding door as claimed in claim 17, wherein the lock pawl is spring-loaded.

22. The sliding door as claimed in claim 17, wherein the lock pawl is lockable.

\* \* \* \* \*